(12) United States Patent
Tsukahara et al.

(10) Patent No.: US 8,066,146 B2
(45) Date of Patent: Nov. 29, 2011

(54) INSULATED CONTAINER AND METHOD OF MANUFACTURING THE SAME

(75) Inventors: Keiji Tsukahara, Hamamatsu (JP); Toshihiko Kumasaka, Hamamatsu (JP); Atsushi Omura, Hamamatsu (JP); Shigeru Nakama, Hamamatsu (JP); Shu Morikawa, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 586 days.

(21) Appl. No.: 12/222,167

(22) Filed: Aug. 4, 2008

(65) Prior Publication Data
US 2009/0039089 A1    Feb. 12, 2009

(51) Int. Cl.
*B65D 81/38* (2006.01)
(52) U.S. Cl. ............... 220/592.27; 220/562; 220/592.2; 156/213; 156/285
(58) Field of Classification Search .......... 220/592.26, 220/592.2, 592.27, 592.25, 562, 592.22, 220/601, 661, 495.08, 495.11, 62.22, 62.11; 29/428, 458; 156/212, 213, 285, 286, 287
See application file for complete search history.

(56) References Cited

U.S. PATENT DOCUMENTS

| | | | | |
|---|---|---|---|---|
| 3,069,045 A | * | 12/1962 | Haumann et al. | 220/592.27 |
| 4,989,750 A | * | 2/1991 | McGarvey | 220/560.01 |
| 5,408,832 A | | 4/1995 | Boffito et al. | |
| 2006/0070589 A1 | | 4/2006 | Uchimura et al. | |

FOREIGN PATENT DOCUMENTS

| | | |
|---|---|---|
| DE | 297 09 658 U1 | 9/1997 |
| DE | 10 2006 012 025 A1 | 9/2007 |
| EP | 1 905 976 A1 | 4/2008 |
| JP | A-2002-058604 | 2/2002 |
| JP | A-2006-104974 | 4/2006 |
| JP | A-2006-124013 | 5/2006 |

* cited by examiner

*Primary Examiner* — Stephen Castellano
(74) *Attorney, Agent, or Firm* — Oliff & Berridge, PLC

(57) ABSTRACT

Disclosed are an insulated container in which a high-performance vacuum heat insulating material is formed around a three-dimensional container and in which heat loss is minimized, and a method of manufacturing the insulated container. An insulated container for heat-insulation storage of a liquid has a resin inner container equipped with liquid flow inlet/outlet portions, an interior member and an exterior member which accommodate the inner container and around which a gas barrier layer is formed, and a heat insulation space which is defined between the interior member and the exterior member and which is held in a pressure-reduced state, with a heat insulating material being sealed therein. Further, flange members are fitted onto the flow inlet/outlet portions, lower flange surfaces of the flange members are bonded to the interior member, and upper flange surfaces thereof are bonded to the exterior member.

7 Claims, 7 Drawing Sheets

INSULATED CONTAINER AND METHOD OF MANUFACTURING THE SAME

CROSS-REFERENCE TO RELATED APPLICATION

The priority application number JP2007-210118 upon which this patent application is based is hereby incorporated by the reference.

BACKGROUND OF THE INVENTION

1. Field of the Invention

The present invention relates to an insulated container for heat-insulation storage of a liquid, and more particularly, to an insulated container for heat-insulation storage of coolant in vehicle engines.

2. Description of the Related Art

Conventionally, as an insulated container necessary for heat-insulation storage of vehicle engine coolant (long life coolant, hereinafter referred to as LLC) and for circulating heat-insulated LLC to the engine when starting the engine to promote the warming-up thereof, there has been known a heat storage tank (insulated container) including an inner cylinder for storing liquid and an outer cylinder accommodating the inner cylinder inside thereof and forming a vacuum insulated space between itself and the inner cylinder (JP 2006-104974 A).

SUMMARY OF THE INVENTION

In order to improve the fuel efficiency at the time of engine start, an insulated container for storing vehicle engine coolant is required to have a heat insulation performance for maintaining the LLC heated through preheating of the engine at high temperature until the next engine start. Further, there is a demand for a reduction in production cost of the insulated container due to the reduction in vehicle cost price. Further, this insulated container is installed in the engine compartment, and hence there is a strong demand for the insulated container to have a configuration allowing accommodation in the limited space in the engine room, which differs from vehicle to vehicle.

However, in JP 2006-104974 A, the inner container and the outer container are formed of a metal such as stainless steel, which leads to a rather high production cost. Further, in order to control the heat bridge at the joint portion between the inner container and the outer container, the stainless steel material to be used is as thin as 1 mm or less, and hence there is a need to prevent deformation due to the difference between the inner pressure and the atmospheric pressure. Further, its configuration is restricted to a cylindrical one, which requires a rather large installation space.

Other examples as disclosed in JP 2002-058604 A and JP 2006-124013 A have been known as examples of heat insulation for a container by means of a vacuum heat insulating material wherein a heat insulating material is sealed in under reduced pressure by a gas barrier film. In these examples, a plate-like vacuum heat insulating material is first formed, and is then wrapped around the container, and hence this method is not applicable to a container having a complicated configuration. Further, this method involves heat loss through the end joint surfaces of the vacuum heat insulating material on the side surface of the container and through gaps formed at the joint portions between the cover portion, the bottom portion, and the side surface portion. Thus, this type of container structure is rather hard to apply to an insulated container of high performance as required of an insulated container for vehicle engines.

In view of the above-mentioned problems in the related art, it is an object of the present invention to provide an insulated container in which a high-performance vacuum insulating material is formed around a container of a three-dimensional configuration and in which heat loss is minimized, and a method of manufacturing the same. This leads, by extension, to the provision of an insulated container allowing use of an inner container formed of resin, which is applicable to a configuration design allowing accommodation in a limited space such as a space inside an engine compartment, and which helps to achieve a reduction in production cost, and a method of producing such an insulated container.

In order to achieve the above-mentioned object, according to a first aspect of the present invention, there is provided an insulated container for heat-insulation storage of a liquid, including an inner container formed of resin and equipped with a liquid flow inlet/outlet portion, an interior member and an exterior member accommodating the inner container and forming a gas barrier layer, and a flange member fitted onto the flow inlet/outlet portion, wherein a heat insulation space in which a heat insulating material is sealed and which is reduced in pressure is formed between the interior member and the exterior member, and wherein the flange member has a lower flange surface bonded to the interior member and an upper flange surface bonded to the exterior member. In this case, the "gas barrier layer" is a layer restricting transmission of gas. A laminate film formed by stacking gas barrier layers together may exhibit an oxygen transmittance as measured according to JIS-K7126-1 of $1.1 \times 10^{-11}$ m$^3$/m$^2$·s·MPa or less and, more preferably, $1.1 \times 10^{-12}$ m$^3$/m$^2$·s·MPa or less. In order to improve the heat insulation property, the pressure of the heat insulation space is controlled to a pressure lower than the atmospheric pressure (reduced-pressure state), and it may range from 0.01 to 100 Pa and, more preferably, from 0.1 to 10 Pa.

According to a second aspect of the present invention, there is provided the insulated container, in which the interior member is formed of a laminate film having an adhesive layer formed on a surface thereof, and in which the adhesive layer has an adhesive layer portion formed on a portion opposed to the inner container, and an adhesive layer portion formed on a portion to be bonded to the lower flange surface of the flange member.

According to a third aspect of the present invention, there is provided the insulated container, in which a direction changing portion surrounded by an adhesive portion where adhesive layers are opposed to each other is formed at a portion of the interior member adjacent to the flow inlet/outlet portion.

According to a fourth aspect of the present invention, there is provided the insulated container, in which a gas barrier layer is formed on a surface of the flange member.

According to a fifth aspect of the present invention, there is provided the insulated container, in which a heat insulating material exists between the flow inlet/outlet portion and the flange member.

According to a sixth aspect of the present invention, there is provided a method of manufacturing an insulated container for heat-insulation storage of a liquid, including covering a resin inner container equipped with a liquid flow inlet/outlet portion with an interior member to which a lower flange surface of a flange member is bonded, the flange member being fitted onto the flow inlet/outlet portion through a flow inlet/outlet portion through-hole, wrapping a heat insulating material around the inner container covered with the interior member, and passing the flow inlet/outlet portion of the inner container around which the heat insulating material is wrapped through an exterior member for vacuum-sealing the heat insulating material to bond the exterior member and an upper flange surface of the flange member to each other, and covering the inner container around which the heat insulating material is wrapped with the exterior member.

The present invention provides the following effects:

(1) Due to the provision of the flange member at the fluid outlet portion of the inner container, the interior member and the exterior member, which are not easily bonded together, can be bonded together reliably and firmly, making it possible to maintain the degree of vacuum of the heat insulation space (heat insulation layer). Further, it is possible to make the thickness of the heat insulation space (heat insulation layer) uniform, thus exerting a superior heat insulation property.

(2) Due to the provision of an adhesive layer on the surface of the interior member facing the inner container in addition to the provision of an adhesive layer on the portion thereof bonded to the lower flange surface of the flange member, it is possible to bond the interior member and the lower flange surface to each other reliably and firmly.

(3) Through the formation of the gas barrier layer on the surface of the flange member, or through the provision of a heat insulating material between the flow inlet/outlet portion and the flange member, it is possible to exert the effects of gas transmission prevention and heat insulation at the flange member.

(4) Due to the above features (1) through (3), it is possible for a resin inner container to be endowed with a performance equivalent to or higher than that of a metal inner container, and hence it is possible to provide an insulated container which allows use of an inner container formed of resin and application to a configuration design allowing accommodation in a limited space such as a space inside an engine room, and which helps to attain a reduction in production cost.

DETAILED DESCRIPTION OF THE PREFERRED EMBODIMENTS

An insulated container according to an embodiment of the present invention is described.

Figure 1:
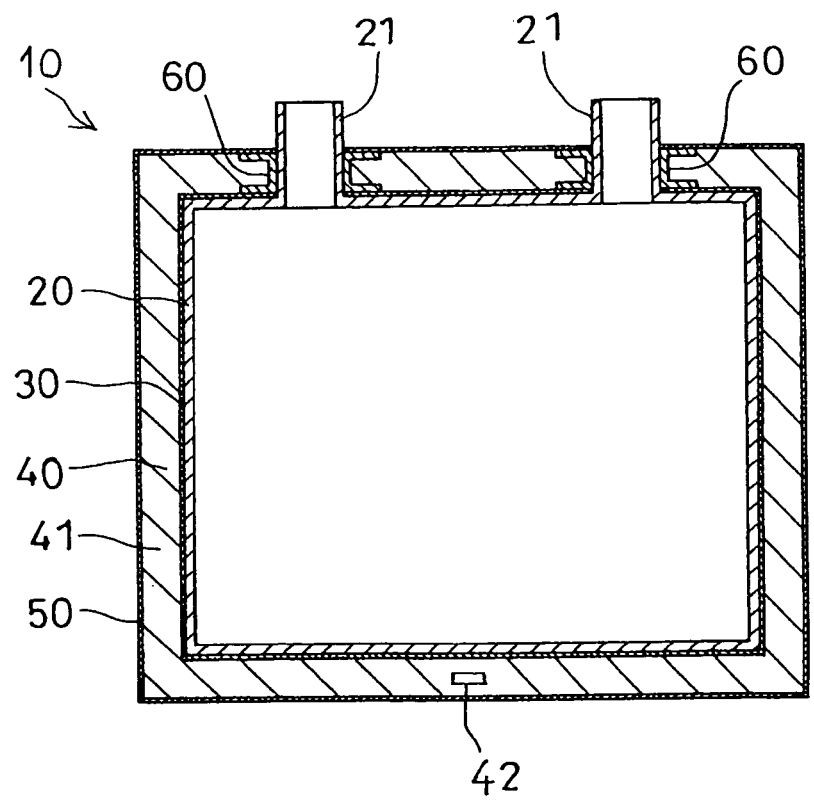
FIG. 1 is a longitudinal sectional view of an insulated container according to the present invention.

FIG. 1 is a longitudinal sectional view of an insulated container according to the present invention.

As shown in FIG. 1, an insulated container 10 for heat-insulation liquid storage is equipped with a resin inner container 20 equipped with liquid inlet/outlet portions 21, 21, an interior member 30 and an exterior member 50 accommodating the inner container 20 and forming a gas barrier layer in the periphery thereof. Formed between the interior member 30 and the exterior member 50 is a heat insulation space 40 in which a heat insulating material 41 is sealed and which is in a reduced-pressure state. Reference numeral 42 indicates a gas adsorbent. Further, flange members 60, 60 are fitted onto the flow inlet/outlet portions 21, 21. Of the two flow inlet/outlet portions 21, 21, one is a liquid flow inlet portion and the other is a liquid flow outlet portion.

Figure 2:
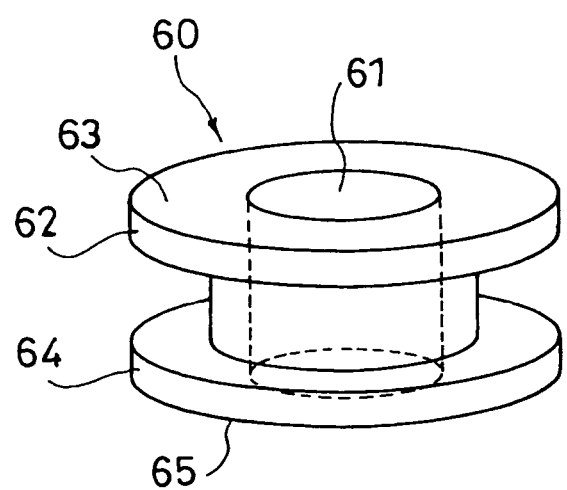
FIG. 2 is a perspective view of a flange member.
Figure 3:
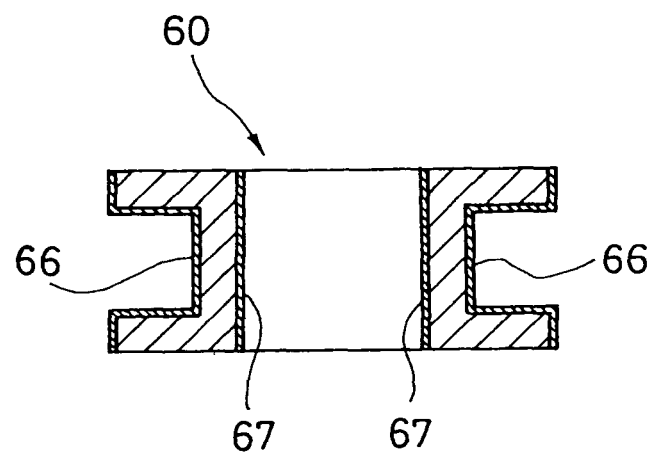
FIG. 3 is a sectional view of the flange member.

FIGS. 2 and 3 are a perspective view and a sectional view, respectively, of the flange member 60 to be fitted onto the flow inlet/outlet portion 21.

As shown in FIG. 2, the flange member 60 is a cylindrical member wherein a flow inlet/outlet portion through-hole 61 is formed at its center, and equipped with an upper end portion 62 and a lower end portion 64 constituting brim portions with a relatively large diameter. An upper surface of the upper end portion 62 constitutes an upper flange surface 63, and a lower surface of the lower end portion 64 constitutes a lower flange surface 65.

Examples of the material of the flange member 60 include metals such as aluminum and stainless steel, and resins such as polyethylene and polypropylene, and, in the present invention, ethylene vinyl alcohol, which easily allows fusion-bonding and which exhibits a low gas transmission performance, is suitably used.

When the flange member 60 is formed of resin, there is a fear of gas being transmitted through the flange member 60 after use for a long period of time, thereby deteriorating the degree of vacuum of the heat insulation space 40, which is a vacuum heat insulation layer. Thus, as shown in FIG. 3, it is desirable for each flange member 60 to have gas barrier layers 66 and 67 formed by plating or the like on the outer layer surface adjacent to the heat insulation space 40 and on the inner layer surface adjacent to the liquid flow inlet/outlet portion 21. While the plating may be of a well-known type, it is possible, for example, to suitably use one in which electrolytic copper is stacked on electroless nickel. The thickness of the gas barrier layers 66 and 67 ranges from 5 to 30 μm and, more preferably, 6 to 15 μm.

From the viewpoint of gas transmission control, it is also possible to form the flange member 60 of metal. In this case, stainless steel, which exhibits low heat conductivity, is suitably used.

The configuration of the flange member 60 is not limited to the one shown in FIG. 2. Accordingly, any other configurations may be adopted as long as it helps to provide the same effects in relation to the interior member 30 and the exterior member 50 described below.

Figure 4:
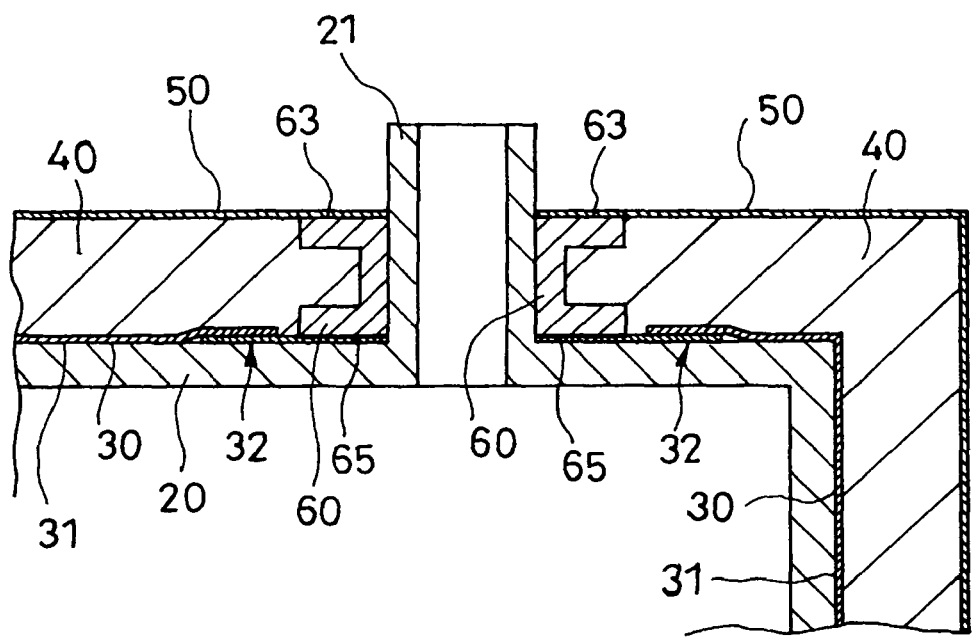
FIG. 4 is a partial enlarged view of a portion around a flow inlet/outlet portion of FIG. 1.

FIG. 4 is a partial enlarged view of the portion around one of the flow inlet/outlet portions 21 shown in FIG. 1.

As shown in FIG. 4, the flange member 60 is fitted onto the flow inlet/outlet portion 21, and the lower flange surface 65 is bonded to the interior member 30, and the upper flange surface 63 is bonded to the exterior member 50. Due to this construction, it is possible to prevent transmission of gas into the heat insulation space 40 from the interior of the inner container 20 and from the exterior of the inner container 20.

Further, due to the bonding using the flange member 60, the operation of bonding the interior member 30 and the exterior member 50 is facilitated. Further, when maintaining the heat insulation space 40 in the pressure-reduced state or when handling the insulated container 10, no force tending to break or separate the interior member 30 and the exterior member 50 is exerted at the bonding portions between the interior member 30 and the lower flange surface 65 and between the exterior member 50 and the upper flange surface 63, making it possible to realize a vacuum heat insulation layer of high reliability. Further, between the flange member 60 and the flow inlet/outlet portion 21, there may be provided a thin heat insulating material such as an inorganic fiber paper sheet. With this construction, it is possible to reduce the quantity of heat flowing out from a boundary between the flange member 60 and the flow inlet/outlet portion 21, making it possible to further improve the heat insulation property of the insulated container 10.

The interior member 30 has an adhesive layer on the surface 31 thereof facing the inner container 20, and it is also necessary to provide an adhesive layer at the portion where the lower flange surface 65 of the flange member 60 is bonded to the interior member 30. Thus, in the portion around the flow inlet/outlet portion 21, there is provided a direction changing portion 32 changing the direction of the adhesive layer formed on the interior member 30 to the heat insulation space 40 side.

The interior member 30 is not limited to the one having the direction changing portion 32, and any other structure may be adopted as long as it is equipped with adhesive layers not only at the portion in contact with the inner container 20 but also at the portion bonded to the lower flange surface 65.

Examples of the resin that can be used as the material of the resin inner container 20 include acrylonitrile butadiene styrene copolymer (ABS), acrylonitrile styrene copolymer (AS), EEA resin (EEA), epoxy resin (EP), ethylene vinyl acetate polymer (EVA), ethylene vinyl alcohol copolymer (EVOH), liquid crystal polymer (LCP), MBS resin (MBS), melamine-formaldehyde (MMF), polyamide (PA), polybutylene terephthalate (PBT), polycarbonate resin (PC), polyethylene (PE), polyethylene terephthalate (PET), tetrafluoroethylene perfluoro-alkyl vinyl ether polymer (PFA), polyimide (PI), polymethyl methacrylate (PMMA), polyacetal resin (POM), polypropylene (PP), polyphthalate amide (PPA), polyphenylene sulfide resin (PPS), polystyrene (PS), polytetrafluoroethylene (PTFE), polyurethane (PU), polyvinyl alcohol (PVA), polyvinyl chloride (PVC), and polyvinylidene chloride (PVDC). By using these resins, it is possible to form an inner container 20 of a complicated configuration through injection molding, extrusion molding or the like, thus avoiding an increase in production cost.

While in the present invention there are no particular limitations regarding the material, structure, and form of the interior member 30 and the exterior member 50, as long as they allow formation of a gas barrier layer and satisfy the above-mentioned gas transmittance, it is possible to suitably use a sheet-like one. An example of the interior member 30 and the exterior member 50 is a multi-layer laminate film including a protective layer, a gas barrier layer, and an adhesive layer. The thickness of such a laminate film may range from 45 to 120 µm and, more preferably, 60 to 100 µm.

While there are no particular limitations regarding the material of the adhesive layer as long as it allows bonding together of the flange members 60, the inner container 20, and the adhesive layer, in the present invention, it is desirable to adopt one of low gas transmittance. More specifically, when the material of the flange members 60 is polyethylene, the adhesive layer may be formed of polyethylene. When the flange members 60 are formed of polypropylene, the adhesive layer may be formed of polypropylene. When the flange members 60 are formed of ethylene vinyl alcohol, the adhesive layer may be formed of ethylene vinyl alcohol, and when the flange members 60 are formed of metal, it is desirable for the adhesive layer to be formed of ethylene vinyl alcohol. The thickness of the adhesive layer ranges from 10 to 70 µm and, more preferably, from 30 to 50 µm.

There are no particular limitations regarding the material of the gas barrier layer as long as it helps to restrict transmission of gas. For example, it is possible to adopt a metal foil such as stainless-steel foil or aluminum foil, and aluminum foil, which exhibits low gas transmittance and is relatively inexpensive, may be suitably used. The thickness of the gas barrier layer ranges from 5 to 30 µm and, more preferably, from 6 to 15 µm.

The protective layer is a layer for protecting the gas barrier layer. For example, the protective layer helps to prevent generation of pin holes, cracks or the like in the aluminum foil, thus making it possible to reliably obtain the gas transmission preventing effect. As the material of the protective layer, it is possible to suitably use a resin such as polyester or nylon. The thickness of the protective layer ranges from 10 to 50 µm and, more preferably, from 20 to 40 µm. It is also possible to form a plurality of protective layers as needed. With such a construction having a plurality of layers, it is possible to endow the protective layers with functions utilizing the characteristics of the resin of each layer.

As the heat insulating material 41 contained in the heat insulation space 40, it is possible to use a well-known one. Examples of the material include an organic porous material such as polystyrene foam, a molding including ceramic powder such as calcium silicate, sillica, or alumina, and an inorganic fibrous heat insulating material formed of glass wool, rock wool, ceramic fiber or the like. In particular, it is desirable to adopt a glass wool which has an average fiber diameter of 5 µm or less and from which adsorbed water has been removed in a high temperature atmosphere. Such a heat insulating material may be used singly or in a combination of two or more of them. Further, the heat insulation space 40, which is a vacuum heat insulation layer, may contain in a sealed state a gas adsorbent 42 in order to prevent a possible reduction in vacuum degree of the vacuum heat insulation layer due to intrusion of gas generated from the heat insulating material 41 or gas transmitted through the resin forming the flange members 60 to enter the heat insulation space from the outside air. As the gas adsorbent 42, a three-layer structure including a calcium oxide layer adsorbing water, a barium/lithium alloy layer adsorbing oxygen and nitrogen, and a cobalt oxide layer adsorbing hydrogen is used. Since the barium/lithium alloy layer adsorbs not only oxygen and nitrogen but also water, it is provided as an intermediate layer between the calcium oxide layer and the cobalt oxide layer, whereby it is possible to efficiently utilize the adsorption property of each layer.

EXAMPLE

Next, a method of preparing the insulated container 10 of the present invention is described in detail with reference to FIGS. 5A through 5G, although the present invention should not be construed restrictively.

As the inner container 20, a rectangular-parallelepiped-shaped polyethylene container having a volume of approximately 2.6 L and a thickness of 8 mm, was used and in one surface of the inner container 20, there were provided liquid flow inlet/outlet portions 21, 21 having an outer diameter of 18.5 mm, an inner diameter of 13 mm, and a height of 30 mm. The flange members 60, 60 were formed of high density polyethylene and had an outer diameter of 36 mm, an inner diameter of 20 mm, a height of 11 mm, and a thickness of 2 mm.

As the interior member 30 and the exterior member 50, laminate films having multi-layer structure including a polyethylene terephthalate layer (12 µm) serving as a protective layer, a nylon layer (15 µm) serving as a protective layer, an aluminum foil layer (6 µm) serving as a gas barrier layer, and a high density polyethylene layer (50 µm) serving as an adhesive layer were used.

As the fibrous heat insulating material 41, white wool manufactured by ASAHI FIBER GLASS, Co., Ltd. was used, and as the gas adsorbent (getter agent) 42, COMBO 3 GETTER manufactured by SAES Getters, S.p.A was used.

Figure 5A:
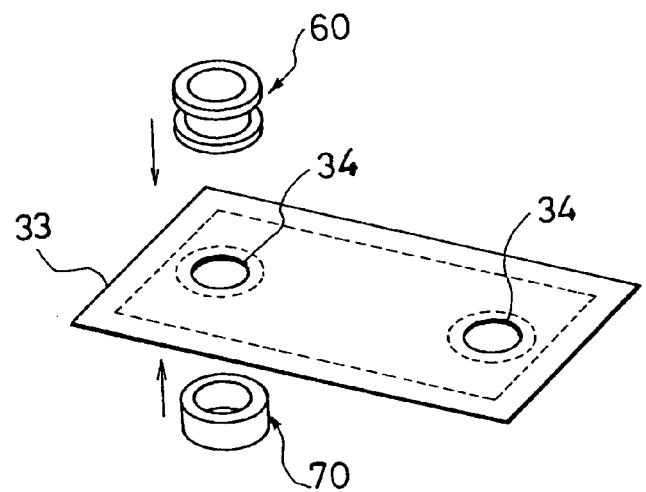
FIGS. 5A through 5G are explanation views showing a method of manufacturing the insulated container according to the present invention.
Figure 5B:
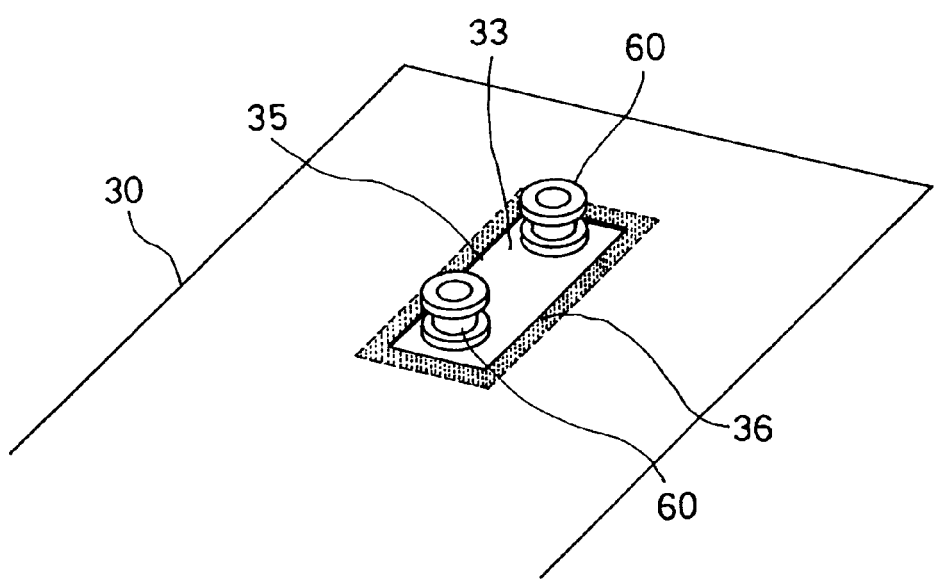

First, as shown in FIGS. 5A and 5B, circular holes 34, 34 corresponding to the liquid flow inlet/outlet portions 21, 21 were formed in a laminate film 33 of 100×200 mm, and the flange members 60, 60 were attached to the adhesive layer side of the laminate film 33 through fusion-bonding by using a ring-shaped heater 70. The fusion-bonding was performed for six seconds with a pressing pressure of 0.2 MPa and at a heater temperature of 180° C. Another fusion-bonding of this example described below was conducted under the same conditions as mentioned above.

Further, as shown in FIG. 5B, the laminate film 33 was matched with another laminate film of 80×180 mm with a hole 35 such that the adhesive layers were opposed to each other, and fusion-bonding was performed on a peripheral portion 36 in a width of 10 mm to effect gluing.

That is, in the peripheral portion 36, the adhesive layer of one laminate film 33 with the flange members 60, 60 attached thereto and the adhesive layer of the other laminate film with the hole 35 through which the flange members 60, 60 were to be passed, were superimposed one upon the other while opposed to each other, and further bonded together.

As a result, the portion of the adhesive layer of the one laminate film 33 surrounded by the peripheral portion 36 constitutes an adhesive layer portion exposed through the hole 35 of the other laminate film toward the heat insulating material 41 described below (see FIG. 5E). By contrast, the portion of the adhesive layer of the other laminate film surrounding the peripheral portion 36 was arranged so as to be directed oppositely, that is, so as to be directed toward the inner container 20 described below.

That is, the interior member 30 including two laminate films had an adhesive layer portion opposed to the inner container 20 (the rectangular portion surrounded by dashed lines in FIG. 5A), and an adhesive layer portion opposed to the lower flange surfaces 65, 65 of the flange members 60, 60 (see FIG. 4). It is also possible, for example, for the interior member 30 to be formed of a single laminate film. In this case, the first adhesive layer portion opposed to the inner container 20 may be formed on one surface of the laminate film, and the second adhesive layer portion may be formed on the portion of the other surface thereof opposed to the lower flange surfaces 65, 65.

Figure 5C:
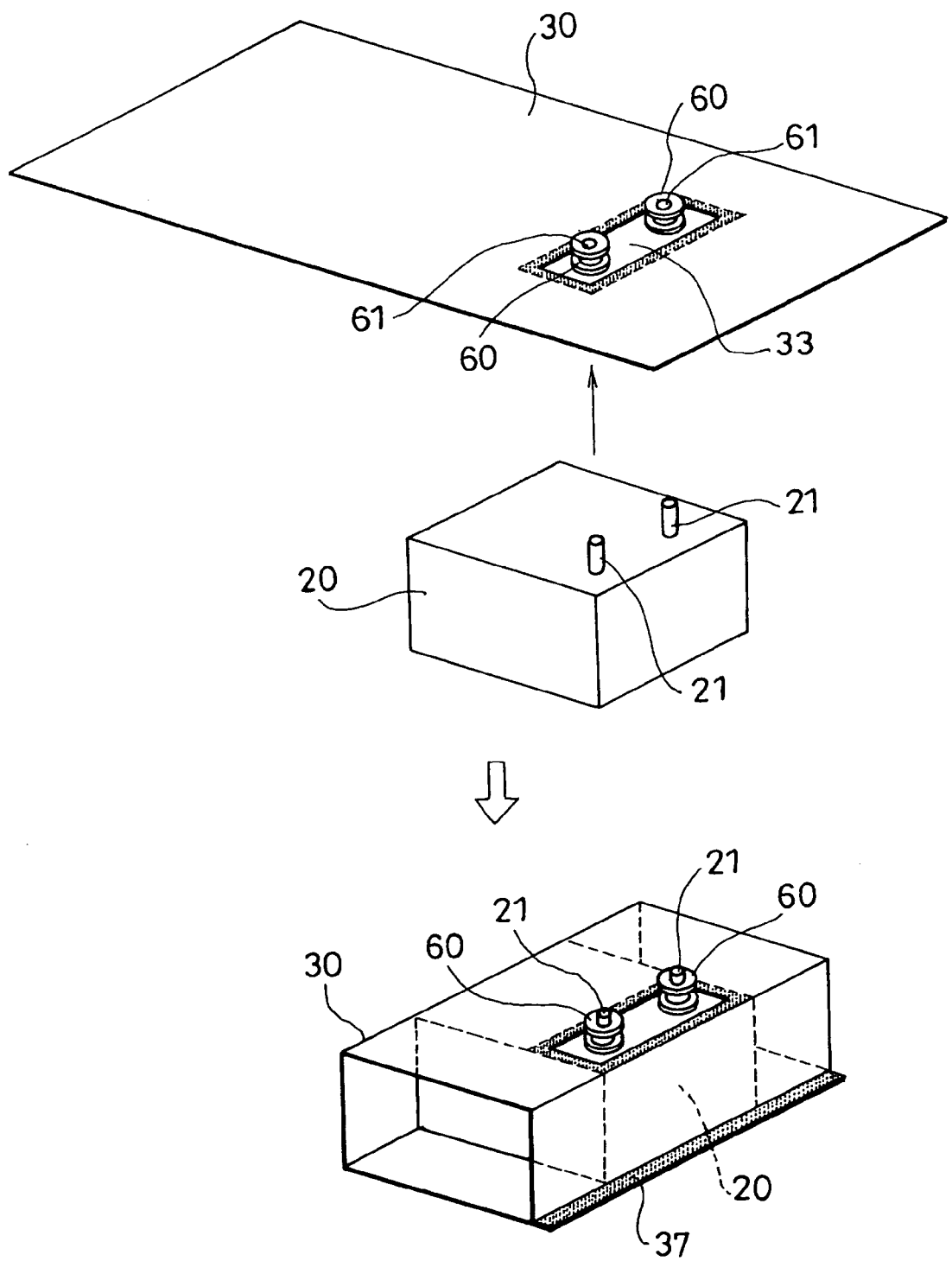

Next, as shown in FIG. 5C, the liquid flow inlet/outlet portions 21, 21 of the inner container 20 were inserted into flow inlet/outlet portion through-holes 61, 61 of the flange members 60, 60, and then the interior member 30 was formed into a tube configuration wrapping the inner container 20, and one side 37 of the interior member 30 was glued through fusion-bonding.

Figure 5D:
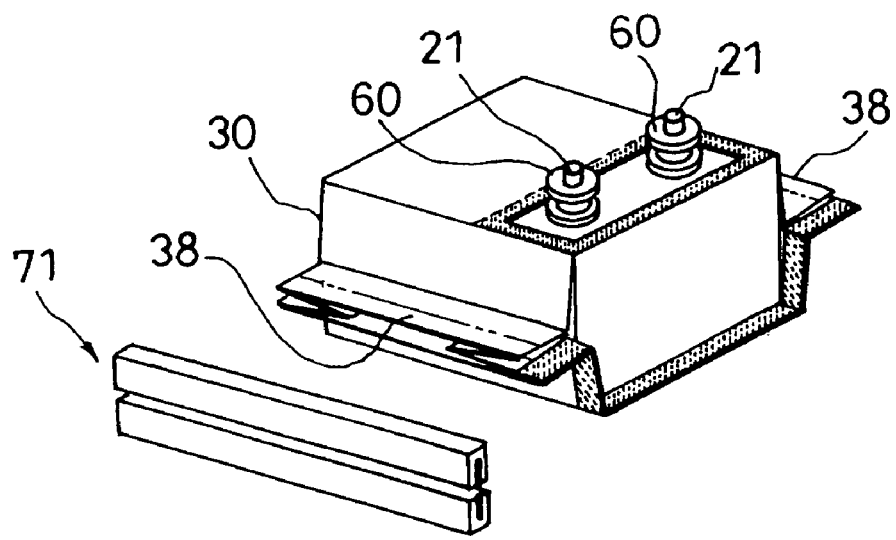

Further, as shown in FIG. 5D, the open portions at both ends of the interior member 30 are folded to form fusion-bonding portions 38, 38, and the adhesive layers were bonded together by heating the fusion-bonding portions 38, 38 by a bar-shaped heater 71 for packaging.

Figure 5E:
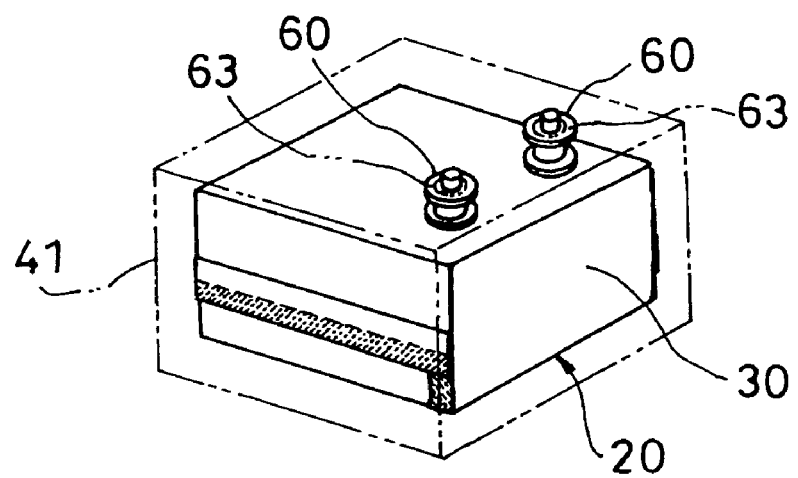

Next, as shown in FIG. 5E, the periphery of the inner container 20, which was packaged in the interior member 30, was covered with glass wool 41 to a thickness such that the upper surface thereof is at the level of the upper flange surfaces 63, 63 of the flange members 60, 60 provided at the flow inlet/outlet portions 21, 21 of the inner container 20. The density of the glass wool 41 at this time was approximately 0.25 g/cm² with respect to the surface area of the inner container 20.

Figure 5F:
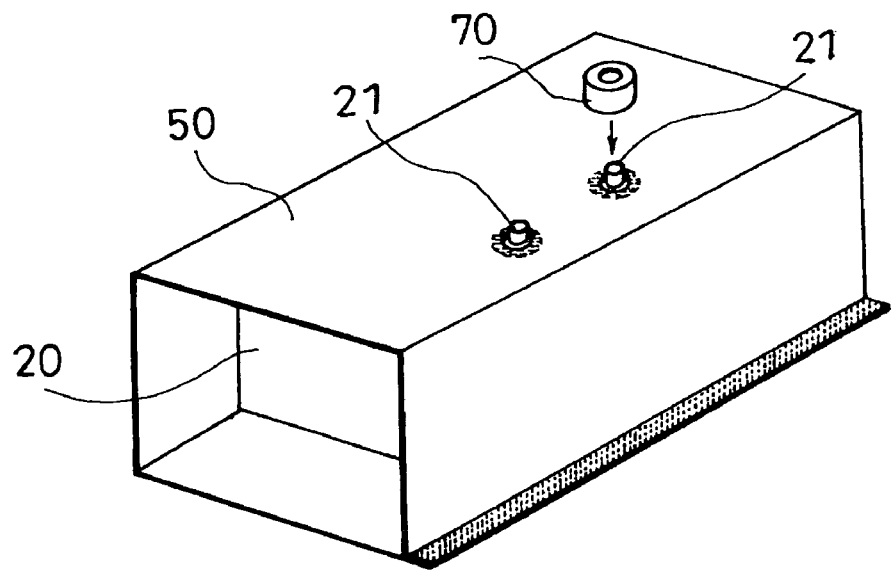

Next, as shown in FIG. 5F, the inner container 20 was inserted into a tubular laminate film (exterior member) 50 with holes formed therein in correspondence with the liquid flow inlet/outlet portions 21, 21, and the exterior member 50 and the flange members 60, 60 were glued to each other through fusion-bonding by using the ring-shaped heater 70.

Figure 5G:
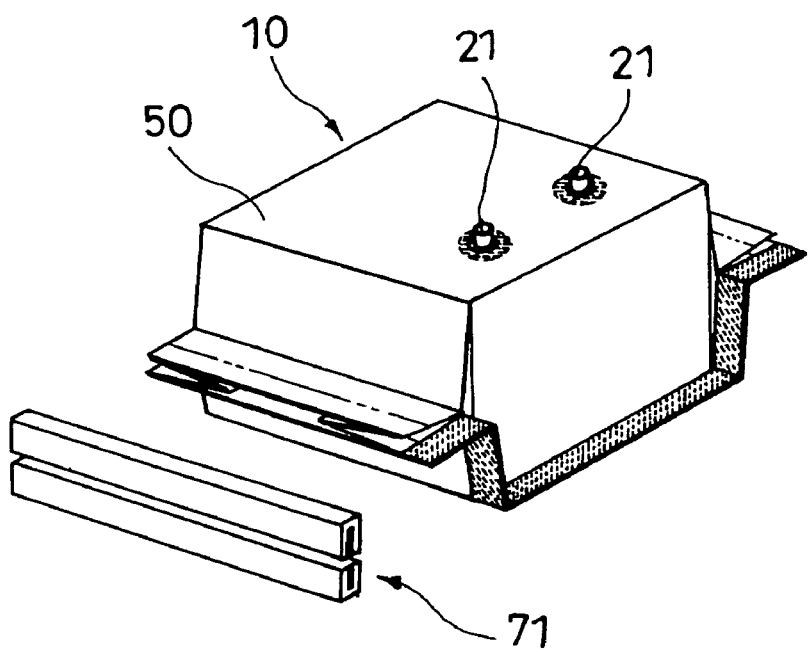

Further, as shown in FIG. 5G, one side of the open portions of the exterior member 50 was folded, and fusion-bonding was performed thereon by the bar-shaped heater 71, forming the exterior member 50 into a bag-like configuration fusion-bonded on three sides except for the bottom portion. Further, this structure was left to stand for 24 hours in an oven at 120° C., thereby evaporating the water contained in the glass wool 41. This structure was dried, and then put into a chamber of argon atmosphere, and a single getter material (approximately 7 g) serving as the gas adsorbent 42 was charged into the exterior member 50 from the bottom portion, where the exterior member 50 was open. After that, the pressure inside the chamber was reduced to 10 Pa, and the open portions of the exterior member 50 were sealed through bonding by the heater 71 provided in the vacuum chamber, thus producing the insulated container 10 having a vacuum heat insulation layer of with a thickness of 10 mm.

Figure 6:
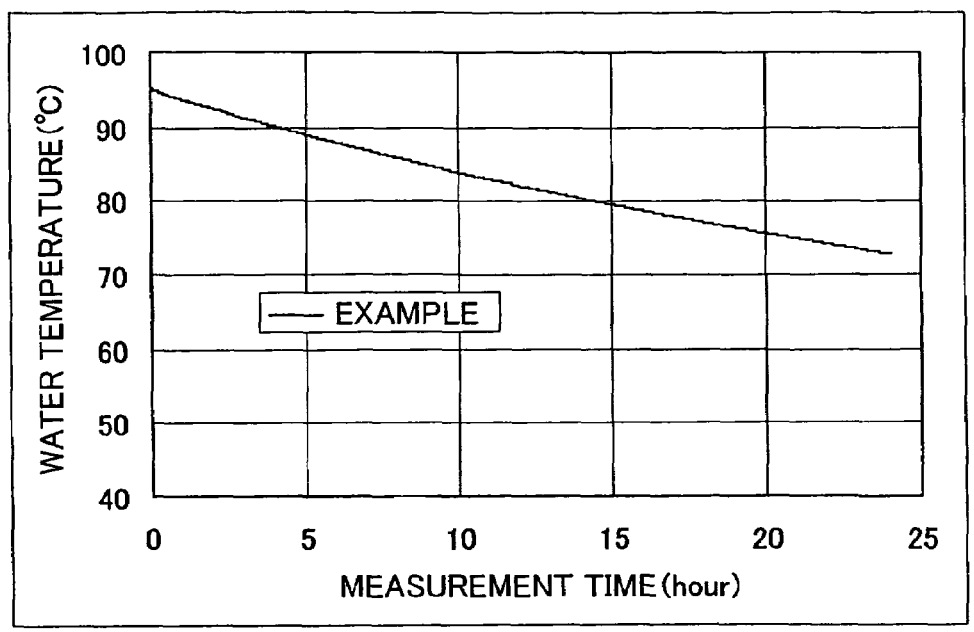
FIG. 6 is a graph showing a heat insulation performance of the insulated container according to an example of the present invention.

Hot water at a temperature of approximately 100° C. was poured into the insulated container 10 of the above example, left to stand for approximately 10 minutes, and then the hot water was disposed of. Then, hot water at a temperature of approximately 100° C. was poured into the insulated container 10 again, and a thermocouple was inserted through one of the liquid flow inlet/outlet portions 21, 21 and the flow inlet/outlet portion 21 was closed with a rubber plug. Starting from the point in time when the water temperature in the insulated container 10 reached 95° C., the water temperature was measured continuously for 24 hours. FIG. 6 shows the measurement results.

According to the measurement results, the water temperature after 12 hours was 82° C., and the water temperature after 24 hours was 73° C., which proved the excellent heat insulation performance of the insulated container 10.

The insulated container of the present invention can be used as an insulated container for heat-insulation storage of a liquid. In particular, it is applicable to an insulated container for heat-insulation storage of LLC for vehicle engines. Apart from this, the insulated container of the present invention is also applicable to a heat-insulation container such as an electric pot or a refrigerator container for liquefied gas or the like.

What is claimed is:

1. An insulated container for heat-insulation storage of a liquid, comprising:
    an inner container formed of resin and equipped with a liquid flow inlet/outlet portion;
    an interior member and an exterior member accommodating the inner container and forming a gas barrier layer, and
    a flange member fitted onto the flow inlet/outlet portion,
        wherein a heat insulation space in which a heat insulating material is sealed and which is reduced in pressure is formed between the interior member and the exterior member, and wherein the flange member has a lower flange surface bonded to the interior member and an upper flange surface bonded to the exterior member,
        wherein the interior member is formed of a laminate film having an adhesive layer formed on a surface thereof, and wherein the adhesive layer has an adhesive layer portion formed on a portion opposed to the inner container, and an adhesive layer portion formed on a portion to be bonded to the lower flange surface of the flange member.

2. An insulated container according to claim 1, wherein a direction changing portion surrounded by an adhesive portion where adhesive layers are opposed to each other is formed at a portion of the interior member adjacent to the flow inlet/outlet portion.

3. An insulated container according to claim 2, wherein a gas barrier layer is formed on a surface of the flange member.

4. An insulated container according to claim 2, wherein a heat insulating material exists between the flow inlet/outlet portion and the flange member.

5. An insulated container according to claim 1, wherein a gas barrier layer is formed on a surface of the flange member.

6. An insulated container according to claim 1, wherein a heat insulating material exists between the flow inlet/outlet portion and the flange member.

7. A method of manufacturing the insulated container according to claim 2, the method comprising:

covering a resin inner container equipped with a liquid flow inlet/outlet portion with an interior member to which a lower flange surface of a flange member is bonded, the flange member being fitted onto the flow inlet/outlet portion through a flow inlet/outlet portion through-hole, the interior member being formed of a laminate film having an adhesive layer formed on a surface thereof, the adhesive layer having an adhesive layer portion formed on a portion opposed to the inner container and an adhesive layer portion formed on a portion to be bonded to the lower flange surface of the flange member;

wrapping a heat insulating material around the inner container covered with the interior member;

passing the flow inlet/outlet portion of the inner container around which the heat insulating material is wrapped through an exterior member for vacuum-sealing the heat insulating material to bond the exterior member and an upper flange surface of the flange member to each other; and covering the inner container around which the heat insulating material is wrapped with the exterior member, wherein the interior member and the exterior member accommodate the inner container and form a gas barrier layer and a heat insulation space, in which a heat insulating material is sealed and which is reduced in pressure, is formed between the interior member and exterior member.

* * * * *

UNITED STATES PATENT AND TRADEMARK OFFICE
CERTIFICATE OF CORRECTION

| | | |
|---|---|---|
| PATENT NO. | : 8,066,146 B2 | Page 1 of 1 |
| APPLICATION NO. | : 12/222167 | |
| DATED | : November 29, 2011 | |
| INVENTOR(S) | : Keiji Tsukahara et al. | |

It is certified that error appears in the above-identified patent and that said Letters Patent is hereby corrected as shown below:

In the title page, column 1, please add the foreign priority information as follows:

(30) Foreign Application Priority Data

August 10, 2007 (JP)...........................................2007-210118

Signed and Sealed this
Twentieth Day of March, 2012

David J. Kappos
*Director of the United States Patent and Trademark Office*